United States Patent [19]

Lagorsse et al.

[11] 4,171,576
[45] Oct. 23, 1979

[54] APPARATUS FOR MEASURING THE CURVATURE OF CURVED OBJECTS

[75] Inventors: Bernard Lagorsse, Portet-sur-Garonne; Michel Agras, Toulouse, both of France

[73] Assignee: Medicornea (Societe Anonyme), Toulouse, France

[21] Appl. No.: 868,536

[22] Filed: Jan. 11, 1978

[30] Foreign Application Priority Data

Jan. 26, 1977 [FR] France .................................. 77 02346

[51] Int. Cl.² ............................ G01B 7/02; G01B 7/06
[52] U.S. Cl. ................................ 33/174 A; 33/147 F; 33/147 N; 33/174 L
[58] Field of Search ............. 33/143 L, 147 N, 147 F, 33/172 E, 174 A, 174 L, 178 E, 200, DIG. 3

[56] References Cited

U.S. PATENT DOCUMENTS

| 1,961,764 | 6/1934 | Horstkotte | 33/172 E |
| 2,566,970 | 9/1951 | Swensson | 33/147 F |
| 3,135,055 | 6/1964 | Butler et al. | 33/174 P |
| 3,315,367 | 4/1967 | Walsh et al. | 33/178 E |
| 3,795,054 | 3/1974 | Kinney | 33/174 L |
| 3,844,047 | 10/1974 | Carson | 33/147 N |

*Primary Examiner*—Richard R. Stearns

*Attorney, Agent, or Firm*—Shlesinger, Arkwright, Garvey and Dinsmore

[57] ABSTRACT

The invention relates to apparatus for measuring the curvature of curved objects such as a lens, and is particularly related to measuring the curvature of hydrophilic pliable contact lenses for use in ophalmology.

The apparatus comprises an annular collar to support the lens being measured, a pointed contacting plunger means for guiding the latter, means for moving said plunger in relation to said support, electrical means to set up a difference in potential between the plunger and the lens support, the two latter being made of electrically conductive material, means for detecting the passage of electrical current between the plunger and the support, a measuring system, and an electronic processing assembly which receives the above signals and which is adapted to store the value of the measurement signal at the moment when the signal from the detecting means appears.

While the invention may in particular be applied to the measurement, under conditions of notable accuracy and speed, of the radius of curvature of the concave face of a pliable contact lens, it may also be employed to measure the radius of curvature of any similar curved object.

12 Claims, 3 Drawing Figures

APPARATUS FOR MEASURING THE CURVATURE OF CURVED OBJECTS

BACKGROUND OF THE INVENTION

The present invention relates to apparatus for measuring the radius of curvature of curved objects such as lenses. It is applicable in particular in the optical field to contact lenses for use in ophalmology, to allow the radius of curvature of the concave face of a pliable contact lens to be measured.

Contact lenses, contact glasses, or pliable or "soft" hydrophilic lenses are intended to press directly against the cornea of the patient's eye and in each case their concave face needs to follow the shape of the cornea accurately. The radius of curvature of the concave face of each lens made should therefore be known as accurately as possible to allow the lens to be classified. A number of methods and pieces of apparatus exist at the present time to allow this radius to be measured.

A first method consists in opening up each lens sequentially to a set of spherical gauges of known curvature until the lens matches to one particular gauge i.e. the one whose convex face matches the concave face of the lens. This method has the drawback of being time-consuming to put into practice, of involving subjective factors to some degree, and of providing only a moderate standard of accuracy which cannot be closer than the difference in curvature between two gauges.

Another method employing optical technology consists in placing the lens in water, in directing a beam of light onto it, and in making measurements by analysing the light rays reflected by the appropriate face of the lens. This method is however complicated to put into practice since the reflection phenomena at this face are interferred with by extraneous reflections and refractions (refraction and reflection at the other face, interference reflection at the surface of the liquid etc). In addition, when placed in the water the lens is unstable and it is a delicate matter to make the measurements.

Another known method consists in forming an image of the lens on a screen by means of a projection device and in superimposing gauges of different radii on this image until one is found which coincides. However, although this method is capable of greater accuracy than that in which the spherical gauges are employed, it still suffers from the other drawbacks of the latter method (the subjective factor, the time taken). What is more, a lens is a three-dimensional object and it is a delicate matter to perform the focussing operations to form a sharp outline image through the transparent material.

Another known method consists in arranging a rigid lens on a support which supports it at its edge, in applying a pointed contacting plunger to the centre of the lens, in observing through a binocular viewer the moment at which the plunger makes contact with the lens, in stopping the movement of the plunger at this moment, and in measuring its travel, which allows the radius to be found. This method is not however applicable to pliable lenses. In effect, although in the case of rigid contact lenses it is possible to detect the moment at which the plunger comes into contact with the lens by detecting the moment when the lens starts to lift, it is very difficult to detect this moment accurately with pliable lenses since the lens begins to deform without the observer being aware of it. It should also be noted that, even in the case of rigid lenses, this method has the drawback of involving subjective factors to some degree since its accuracy depends upon the visual acuity of the observer and his ability to detect the lifting of the lens as soon as it starts.

Mention should also be made of U.S. Pat. No. 3,135,055, which relates to a different field but which discloses a system for checking a part of which certain means have obvious analogies with certain means of the invention. The purpose of this system is however different from that of the invention, since it consists in measuring the deformation of a rigid part from an ideal shape, and its structure makes it suited only to determining dimensional errors at various points of the rigid part, which is held immobile, in relation to nominal dimensions previously placed in store. This system is completely unsuited to providing a value for the radius of curvature of a light and possibly pliable object such as a contact lens directly in only one (or a small number of) measurement operations. In particular the system disclosed in this U.S. patent specification assumes that the part being dealt with is held completely immobile in all three dimensions during measurement and, even if the electronic means of this system were to be modified to enable a radius of curvature to be measured (which is in itself not an obvious thing to do) such a system would still not be suitable in practice for application to pliable contact lenses, which are impossible to clamp completely immobile in all dimensions in a simple and speedy fashion and without distorting them.

It is a primary object of the invention to alleviate or minimize the disadvantages of the conventional methods of measurement set forth above and to provide a measuring apparatus, which by a simple and swift operation, enables the radius of curvature of a lens to be measured with great accuracy and with no subjective factors being involved. To simply the terminology, the term "lens" will be used hereinafter, but it should be understood that this term must not be taken in a limiting sense and that the invention is applicable to measuring the radius of curvature of any other similar curved object.

Another object is, in addition, to enable the radius of curvature of pliable curved objects, such as contact lenses made of synthetic hydrophilic material, to be measured with no risk of error due to deformation of the lens or object.

SUMMARY OF THE INVENTION

To achieve these and other objects of the invention which will become apparent in the following, the invention accordingly consists in apparatus for measuring the radius of curvature of a curved object such as a lens, comprising an annular collar made of an electrically conductive material, an annular bearing face on said collar to support and position a lens by its periphery, a pointed contacting plunger made of an electrically conductive material arranged at the centre of said collar on its axis in such a way as to be electrically isolated from said collar guide means which allow relative translatory movement by said plunger in relation to said collar along the axis of said collar, means for moving said plunger in relation to said collar on the axis of said collar, electrical means adapted to set up a difference in electrical potential between said plunger and said collar, means for detecting the passage of an electrical current between said plunger and said collar, said means being arranged to emit an electrical blocking signal in the event of current passing, a measuring system associated with said pointed contacting plunger and said collar which is adapted to emit an electrical measurement signal which is a function of the position of said plunger relative to said collar, and electronic processing means connected to said measuring system and to said detecting means to receive said measurement signal and said blocking signal, said electronic processing means being adapted to store the value of said measurement signal at the moment when said blocking signal appears.

Trials have shown that a pliable hydrophilic lens (which is what the present invention is particularly intended for) passes electrical current when two electrodes carrying voltage come into contact with it. Thus, in the apparatus of the invention, as soon as the plunger comes into contact with the lens, an electrical current arises between the plunger and the collar, whose bearing face acts as a reference plane. The means for detecting this current then emit a blocking signal which causes the measurement signal coming from the measurement system to be stored. No matter what movement is subsequently performed by the plunger relative to the collar, the operator has available information directly representative of the relative position in which the plunger lay with respect to said collar at the exact moment when it made contact with the lens and before the latter was in any way deformed or lifted. There is obtained in this way a very accurate measurement of the radius of curvature in which subjective factors play no appreciable part and which does not require the lens to be fixed in three dimensions, since all that is necessary is for the lens to be placed on the collar.

It may be pointed out that apparatus according to the invention enables the measurement operation to be remarkably quick and simple to carry out since the operator is able to set the plunger in motion relative to the collar with no special precautions. The value of the measurement signal is stored at the precise moment when the plunger makes contact with the lens no matter how the movement proceeds before and after this moment.

Curved objects which are not conductors of electricity by virtue of their natural properties (being conductive by the very nature of their material or being of a hydrophilic nature which allows the material to be made conductive) may be measured by means of apparatus according to the invention if provision is made for a preliminary operation intended to render them temporarily conductive on the surface. In the majority of cases this operation simply consists in moistening the object or in dipping it into a conductive solution to form a very thin conductive film on its surface.

It should be noted that, in the general definition of the apparatus of the invention, mention was made of guidance or relative movement of the contacting plunger in relation to the collar. This definition covers both the case where the collar is fixed and the plunger movable and the opposite case where the collar is movable and the plunger fixed. Nevertheless, the first arrangement mentioned above is advantageous in practice since it results in a simpler mechanical structure.

Thus, in a preferred embodiment, the collar is arranged in a fixed position in such a way that its annular bearing face is substantially horizontal. It is advantageously secured to an electrically insulating sleeve which is pierced by a substantially vertical passage coaxial with the said collar in which the pointed contacting plunger is housed, the shape of the latter being adapted to allow it to slide in the passage.

Furthermore, apparatus according to the invention is preferably supplemented by mechanical means for adjusting the initial position of the plunger in relation to the collar, the measurement system incorporating resetting means adapted to enable the zero point of said system to be brought into agreement with the initial position of the plunger.

The measurement system mentioned above may comprise quite simply a sensor for measuring movement of a known type which comprises a movable rod and a photoelectric assembly which emits cyclic scanned signals representing the movements of said rod. The contacting plunger mentioned above is connected mechanically to the rod of the sensor in such a way that the movements of these members are synchronised.

In addition, in a preferred embodiment, the detecting means which are intended to emit a blocking signal in the event of a current appearing between the contacting plunger and the collar, comprise an electronic flip-flop system able to change over from an initial state, corresponding to no current between the plunger and the collar, to another state when a current arises between these members. When the flip-flop system is in this latter state, the blocking signal mentioned above is available at the output of the system and causes the signal from the measuring sensor to be stored. The flip-flop system is provided with a control input which enables it to be reset to its initial state at the beginning of each measurement operation.

The electronic processing assembly, whose function is to store the measurement signal at the moment when the blocking signal appaears, preferably comprises:

(a) a logic gate which receives the measurement signals from the sensor at one input and the blocking signals available from the output of the flip-flop system at an inhibiting input, this gate being adapted to allow the measurement signals to pass in the absence of a blocking signal and to prevent them from passing when such a signal is present, and (b) an electronic counter which is arranged at the output of the logic gate so as to be incremented by the signals coming from the gate.

The electronic means described above rely on conventional components of relatively modest cost and allow the apparatus to be extremely reliable in operation. This operation will now be summarised: when the plunger and the rod of the measuring sensor are moved, the sensor emits cyclic measurement signals which are representative at any given time of the amount of such movement relative to the position of the collar which serves as a reference. The flip-flop system being in its initial state, these signals pass through the logic gate mentioned above and increment the electronic counter, whose count at any given time represents the amount of movement. At the moment when the contacting point of the plunger makes contact with the lens, the flip-flop system changes over to its other state and the measurement signals are inhibited from passing through the logic gate. The counter is no longer incremented and remains fixed at the count which it had reached at the moment of contact. Previous calibration or a correlation chart enables the radius of curvature corresponding to this count to be found.

BRIEF DESCRIPTION OF THE DRAWINGS

The invention having been described in broad terms, other features will become apparent from the following description which is given with reference to the accompanying drawings which show a preferred embodiment of the invention by way of non-limiting example. In the drawings, which form an integral part of the description.

DETAILED DESCRIPTION OF PREFERRED EMBODIMENT

Figure 1:
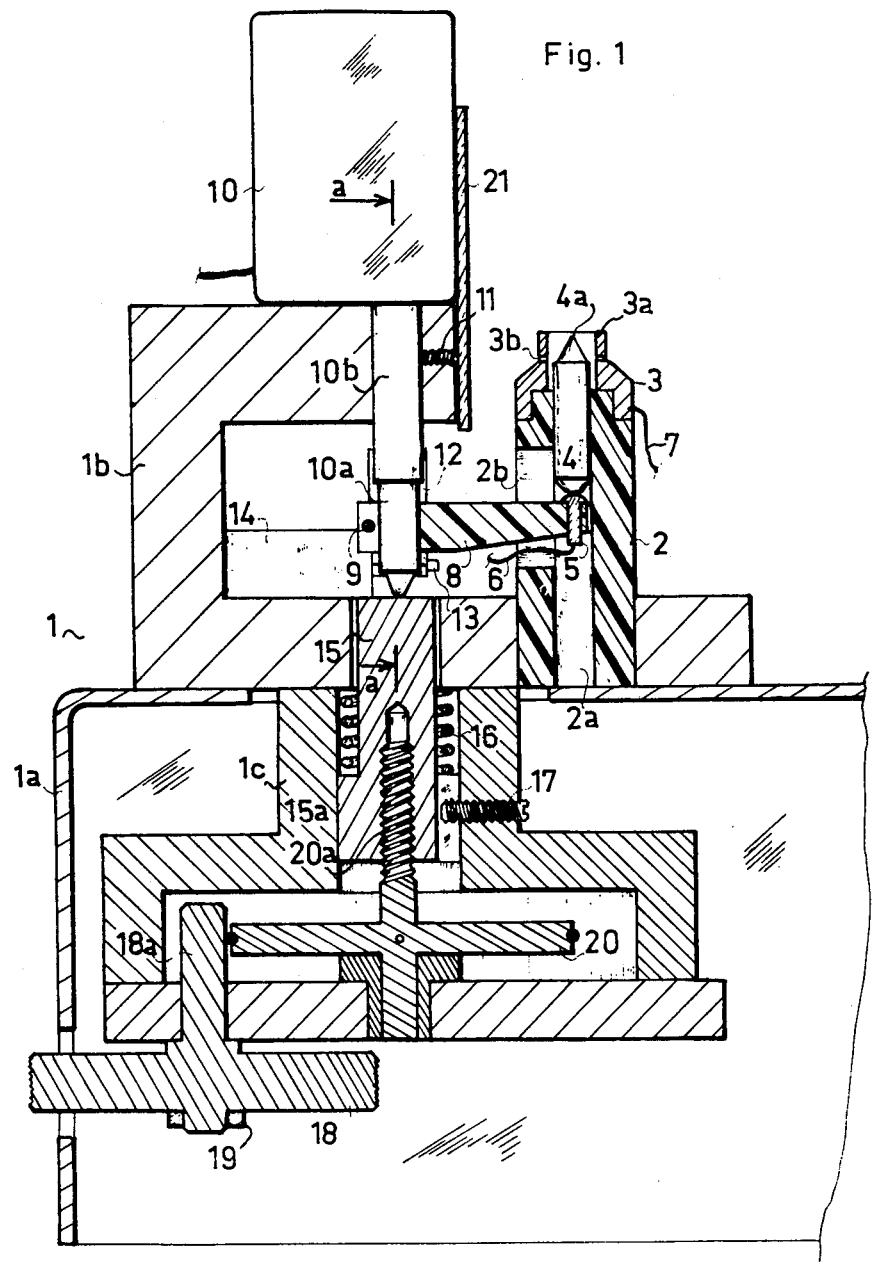
FIG. 1 is a partial section through the preferred embodiment in a vertical plane b—b.
Figure 2:
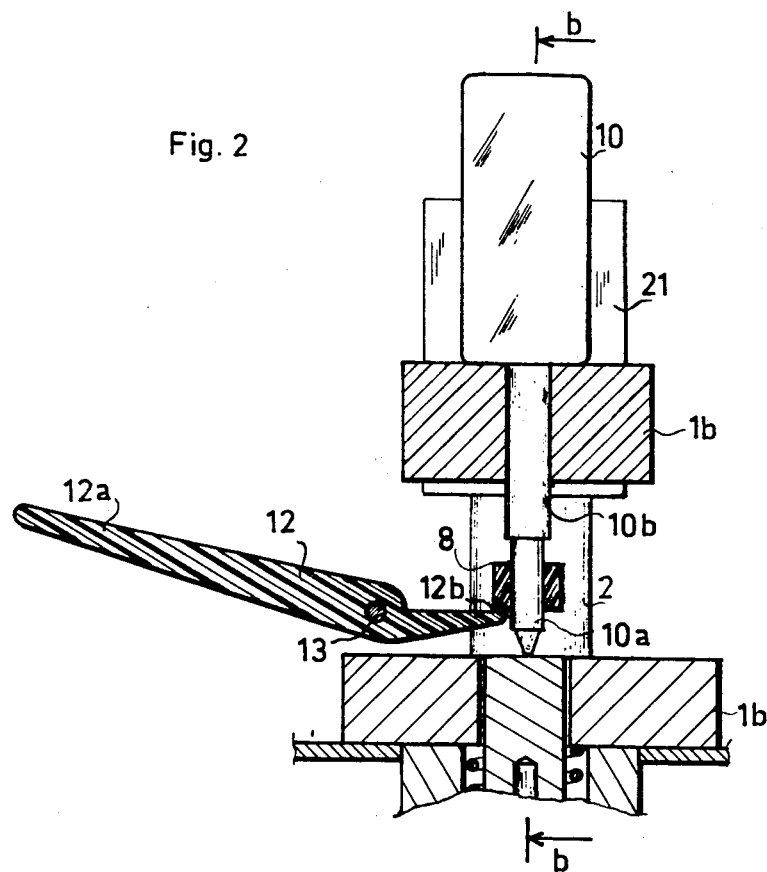
FIG. 2 is a partial section in a vertical plane a—a orthogonal to the previous plane of section.

The apparatus which is shown by way of example in FIGS. 1 and 2 has a frame work 1 formed by a base 1a, a C-shaped guide and fixing member 1b, and a carrier piece 1c which is fixed under the C-shaped member 1b in the base 1a.

The lower arm of the C-shaped guide and fixing member 1b carries an electrically insulating sleeve 2 which is pierced by a vertical axial passage 2a and a lateral opening 2b which opens to face the C-shaped member 1b.

A collar 3 is fixed on top of the sleeve 2 coaxially therewith. This collar is made of an electrically conductive material and has at the top an annular bearing face 3a which lies in a horizontal plane orthogonal to the vertical axis of the sleeve 2. In addition, the collar is pierced by a plurality of lateral vents 3b.

The sleeve 2 contains a pointed contacting plunger 4 which is arranged in the passage within it in such a way as to be able to slide vertically. The function of the vents 3b is to prevent an under-pressure or over-pressure from being generated when a lens is placed on the bearing face 3a and the plunger 4 moves. The pointed plunger 4 is made of an electrically conductive material and is provided with a conical contacting point 4a at the top. It is electrically isolated from the collar 3 whose inside diameter is made larger than the diameter of the passage in the sleeve 2 for this purpose.

At the bottom, the plunger 4 rests on an electrically conductive member 5 connected to a conductive wire 6. The collar 3 is connected to a conductive wire 7 which enables it to be brought to an electrical potential different from that to which the plunger 4 is brought by means of the wire 6. To this end, the collar and the plunger are arranged in series in an electrical circuit, termed a blocking circuit, which contains a low-voltage electrical source. When a hydrophilic lens is placed on the bearing face of the collar 3, this blocking circuit carries an electrical current as soon as the plunger comes into contact with the lens.

Furthermore, the member 5 is carried by an arm 8 which is made of an insulating material and which enables the plunger to be raised or to be allowed to descend again. The arm 8 has a split cylindrical end which is clamped by a screw 9 around a movable rod 10a of a movement-measuring sensor 10. This sensor is carried by the upper arm of the C-shaped guide and fixing member 1b and includes in conventional fashion a cylinder 10b in which the movable rod 10a slides. This cylinder 10b passes through the upper arm of the C-shaped member 1b. and is secured to it by means of a grub screw 11.

The measuring sensor 10 is of a known kind. It is for example possible to use a digital measurement sensor of the type marketed by Messrs. Dr. Johannes Heidenhain under the type number Metro 1010. This sensor has a photoelectric assembly and a precision glass scale graduated in a series of lines, over which the movable rod 10a moves. Cyclic electrical signals are generated by scanning the scale photoelectrically as the rod moves. These signals provide information representing the amount of movement at any given time.

The plunger 4 and the rod 10a of the measuring sensor can be moved manually to perform synchronous vertical movements of identical amplitude by means of a rocking lever 12 (FIG. 2) which is hinged by a shaft 13 to a fixed part 14 secured to the C-shaped member 1b. The operator operates this lever 12 by pressing against its end 12a. Its opposite end 12b engages under the arm 8 which connects the plunger and the rod 10a of the measurement sensor mechanically, thus enabling these members to be raised.

In addition, the apparatus is supplemented by mechanical means for adjusting the initial position of the plunger 4 in relation to the lens support collar 3. These means are intended to enable the contacting point 4a of the plunger to be positioned initially in the plane of the bearing face 3a of the collar.

In the present embodiment, these means comprise a support piece 15 of cylindrical shape which is arranged to act as a support for the end of the rod 10a of the measurement sensor in such a way as to define an extreme position for this rod. The support piece is able to move in the carrier piece 1c housed in the base. A spring 16 which bears against a shoulder 15a on the support piece thrusts it downwards, while a groove which is formed in the said part where the shoulder is situated and which is associated with a screw which acts as an angular stop prevents the part from turning on its axis and allows it only to move vertically in translation under the guidance of the carrier part 1c.

The support part 15 is associated with micrometer setting means to allow its position to be adjusted. In the present embodiment these means comprise:

(a) a knurled setting knob 18 which projects from the base through a slot provided for this purpose and which is carried by a U-shaped support (which can be seen in cross-section at 19 in FIG. 1) to enable it to turn about a vertical axis, this knob being integral with a cylindrical stem 18a coaxial with it, and (b) a disc 20 which is driven frictionally as a result of the interposition of an O-ring bearing against the stem 18a, the disc being integral with an actuating spindle 20a inserted in a tapped bore contained in the support part 15.

Such means enable the position of the part 15 along its vertical axis and thus the initial position of the rod 10a and the plunger 4, to be very accurately defined.

The initial position of these members may be set or checked at the beginning of each series of measurements by arranging on the collar a setting up piece whose face is as flat as possible and by bringing the plunger into contact with it by operating the knurled knob 18.

In the embodiment which is described and shown, there is also a mirror 21 secured to the front face of the C-shaped member 10 make it easier to position the lens on the collar.

Figure 3:
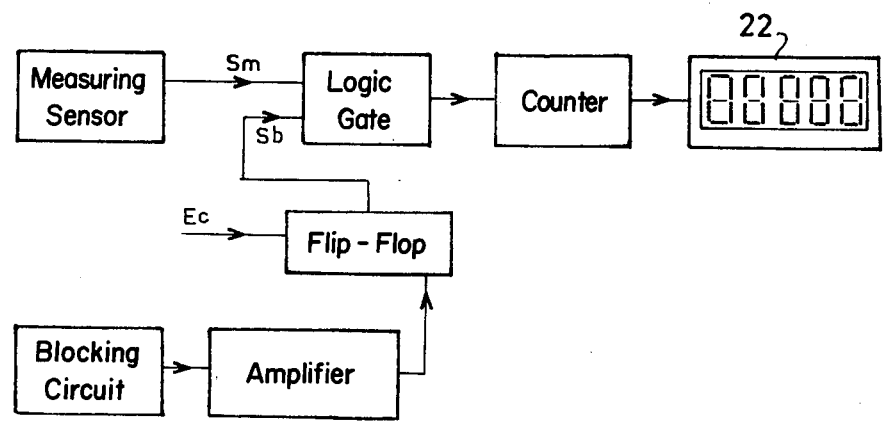
FIG. 3 is a block diagram of the electrical means with which this embodiment is equipped.

In FIG. 3 is seen a block-diagram representation, with single-wire connections, of the electrical and electronic means with which the apparatus is equipped.

As shown in this Figure, the blocking circuit already mentioned is connected to an amplifier and to an electronic flip-flop system which emits a blocking signal Sb from the moment when a current is detected in the said circuit. This flip-flop system may be formed by a conventional two state Rs flip-flop. The two states are an initial state in which the flip-flop is situated as long as no current appears in the blocking circuit and a complementary state to which it changes over at the moment when such a current appears, thus causing the blocking signal Sb to appear at its output. A control input Ec enables the flip-flop system to be reset to its initial state after each measurement.

The measuring sensor transmits cyclic measurement signals Sm to the input of a logic gate which also receives, at an inhibiting input, the blocking signals Sb which are available from the output of the flip-flop system. This logic gate is adapted to allow the measurement signals to pass in the absence of a blocking signal and to inhibit them from passing when such a signal is present.

An electronic counter receives the signals from the logic gate and is incremented by these signals, so that its count represents the amplitude of the movement of the movable rod of the sensor 10 and thus of the plunger 4. When the plunger comes into contact with the lens whose radius of curvature is to be measured, blocking occurs and the counter remains at the count which had been reached at this moment.

A digital display system 22 may be associated with the electronic counter to display its count. It may be mentioned that the counter is provided in conventional fashion with zero reset means which enable it to be set to zero when the plunger is in the initial position defined by the setting means already described.

It will be realised how useful is the measuring apparatus according to the invention, which, by a simple and quick measurement, makes it possible to find the radius of curvature of the concave (or possibly the convex) face of a pliable hydrophilic lens or by any other curved object which is electrically conductive or has been made conductive beforehand. This measurement does not rely on subjective judgements and can be made by personnel having no special qualifications. Prototypes which have been produced have shown, from test measurements made on spherical metal test-pieces of known curvature, that the accuracy obtained is such that the absolute margin of error of the measurements is less than approximately 1 micron.

In addition, each measurement operation is extremely quick and in practice takes between 5 and 10 seconds. This an important advantage in the case of a measurement involving a pliable hydrophilic lens since, after this time, the lens will dry out in the air and will lose its original geometrical characteristics.

The invention is not of course restricted to the terms of the above description and covers all modifications thereof as defined by, and within the scope of, the appended claims.

We claim:

1. An apparatus for measuring the radius of curvature of a curved object such as a lens, comprising an annular collar made of an electrically conductive material, an annular bearing face on said collar to support and position a lens by its periphery, a pointed contacting plunger made of an electrically conductive material arranged at the center of said collar on its axis in such a way as to be electrically insulated from said collar, guide means allowing relative translatory movement by said plunger in relation to said collar along the axis of said collar, means for moving said plunger in relation to said collar on the axis of said collar, means for detecting the passage of an electrical current between said plunger and said collar, said means being arranged to emit an electrical blocking signal in the event of current passage, a measuring system associated with said pointed contacting plunger and said collar which is adapted to emit an electrical measurement signal as a function of the position of said plunger relative to said collar, electronic processing means connected to said measuring system and to said detecting means for receiving said measurement signal and said blocking signal and setting up a difference of potential between said plunger and said collar and comprising a low voltage electrical source arranged in a blocking circuit including said plunger and said collar in series, said electronic processing means being adapted to store the value of said measurement signal at the moment when said blocking signal appears, said detecting means being connected to said blocking circuit and comprising an amplifier and an electronic flip-flop system capable of changing over from an initial state corresponding to the absence of current in said blocking circuit to another state when current appears in said circuit, said blocking signal being available in said other state from the output of said flip-flop system, said flip-flop system being provided with a control input enabling a reset to said initial state.

2. Measuring apparatus according to claim 1, wherein said guide means comprise an electrically insulating sleeve to which said collar is secured so that its annular bearing face is substantially horizontal, said sleeve moving a substantially vertical passage coaxial with said collar in which is housed said sensing plunger, said sensing plunger having a shape suitable to allow it to slide in said passage.

3. Measuring apparatus according to claim 1, which further includes mechanical means for adjusting the initial position of said plunger relative to said collar, said electronic processing means further including zero reset means adapted to enable the zero point of said electronic processing means to be brought into agreement with the initial position of said plunger.

4. Measuring apparatus according to claim 3 wherein said means for adjusting the initial position of said contacting plunger comprises a support part which is adapted to serve as a support for the end of said rod of said measuring sensor so as to define its extreme position, said support part including micrometer setting means to allow its position to be adjusted and to allow said contacting point of said plunger to be positioned in the plane of the bearing face of said collar.

5. Measuring apparatus according to claim 1, wherein said measuring system comprises a movement-measuring sensor of the kind comprising a movable rod and a photoelectric assembly which emits cyclic scanned signals representing the movements of said rod, said sensing plunger being mechanically connected to said rod in such a way that the movements of said plunger and said rod are synchronised.

6. Measuring apparatus according to claim 5 in combination, wherein said electronic processing means comprises a logic gate which receives the measurement signals from said measuring sensor at one input and the blocking signals available from the output of the flip-flop system at an inhibiting input, said gate being adapted to allow the measurement signals to pass in the absence of a blocking signal and to inhibit them from passing when such a signal is present, an electronic counter being arranged at the output of said logic gate so as to be incremented by the signals coming from said gate.

7. Measuring apparatus according to claim 5, wherein said means for moving said plunger in relation to said collar comprise a rocking lever for manual operation and which is mechanically connected to said sensing plunger and to said rod of said measuring sensor to cause them to move in synchronisation.

8. An apparatus for measuring the radius of curvature of a curved object comprising an annular collar of an electrically conductive material, an annular bearing face on said collar for supporting and positioning a lens by its periphery, a pointed contacting plunger of an electrically conductive material arranged at the center of said collar on its axis so as to be electrically insulated from said collar, guide means permitting relative translatory movement by said plunger in relation to said collar along the axis of said collar, means for moving said plunger in relation to said collar on the axis of said collar, electrical means adapted to set up a difference in electrical potential between said plunger and said collar, means for detecting the passage of an electrical current between said plunger and said collar, said means being arranged to emit an electrical blocking signal in the event of current passage, a measuring system associated with said contacting plunger and said collar for emitting an electrical measurement signal as a function of the position of said plunger relative to said collar, electronic processing means connected to said measuring system and to said detecting means for receiving said measurement signal and said blocking signal, said electronic processing means being adapted to store the value of said measurement signal at the moment when said blocking signal appears, said electronic processing means further including zero reset means adapted to enable the zero point of said electronic processing means to be brought into agreement with the initial position of said plunger, and mechanical means for adjusting the initial position of said plunger relative to said collar.

9. A measuring apparatus as in claim 8 and wherein said guide means comprises an electrically insulating sleeve to which said collar is secured so that its annular bearing face is substantially horizontal, said sleeve having a substantially vertical passage coaxial with said collar in which is housed said sensing plunger, said sensing plunger having a shape suitable to allow it to slide in said passage.

10. A measuring apparatus according to claim 8 wherein said measuring system comprises a movement-measuring sensor of the kind comprising a movable rod and a photoelectric assembly for emitting cyclic scanned signals representing the movements of said rod, said sensing plunger being mechanically connected to said rod so that the movements of said plunger and said rod are synchronized.

11. A measuring apparatus according to claim 10 wherein said means for moving said plunger in relation to said collar comprises a rocking lever for manual operation and which is mechanically connected to said sensing plunger and to said rod of said measuring sensor so that said sensing plunger and said rod move in synchronization.

12. A measuring apparatus according to claim 8 wherein said means for adjusting the initial position of said contacting plunger comprises a support part adapted to serve as a support for the end of said rod of said measuring sensor so as to define its extreme position, said support part including micrometer adjusting means enabling its position to be adjusted and to permit said contacting point of said plunger to be positioned in the plane of the bearing face of said collar.

* * * * *